United States Patent Office 3,038,255
Patented June 12, 1962

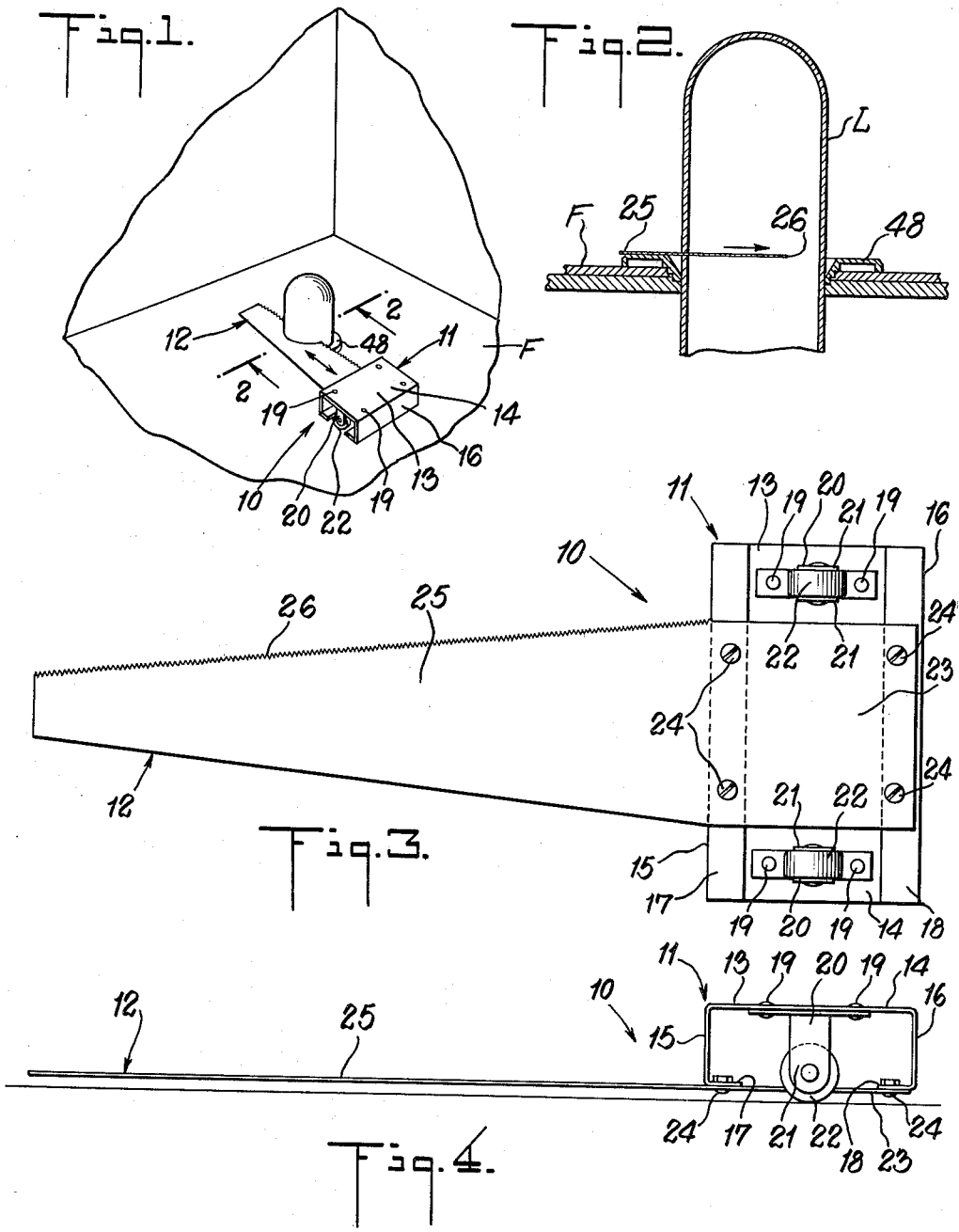

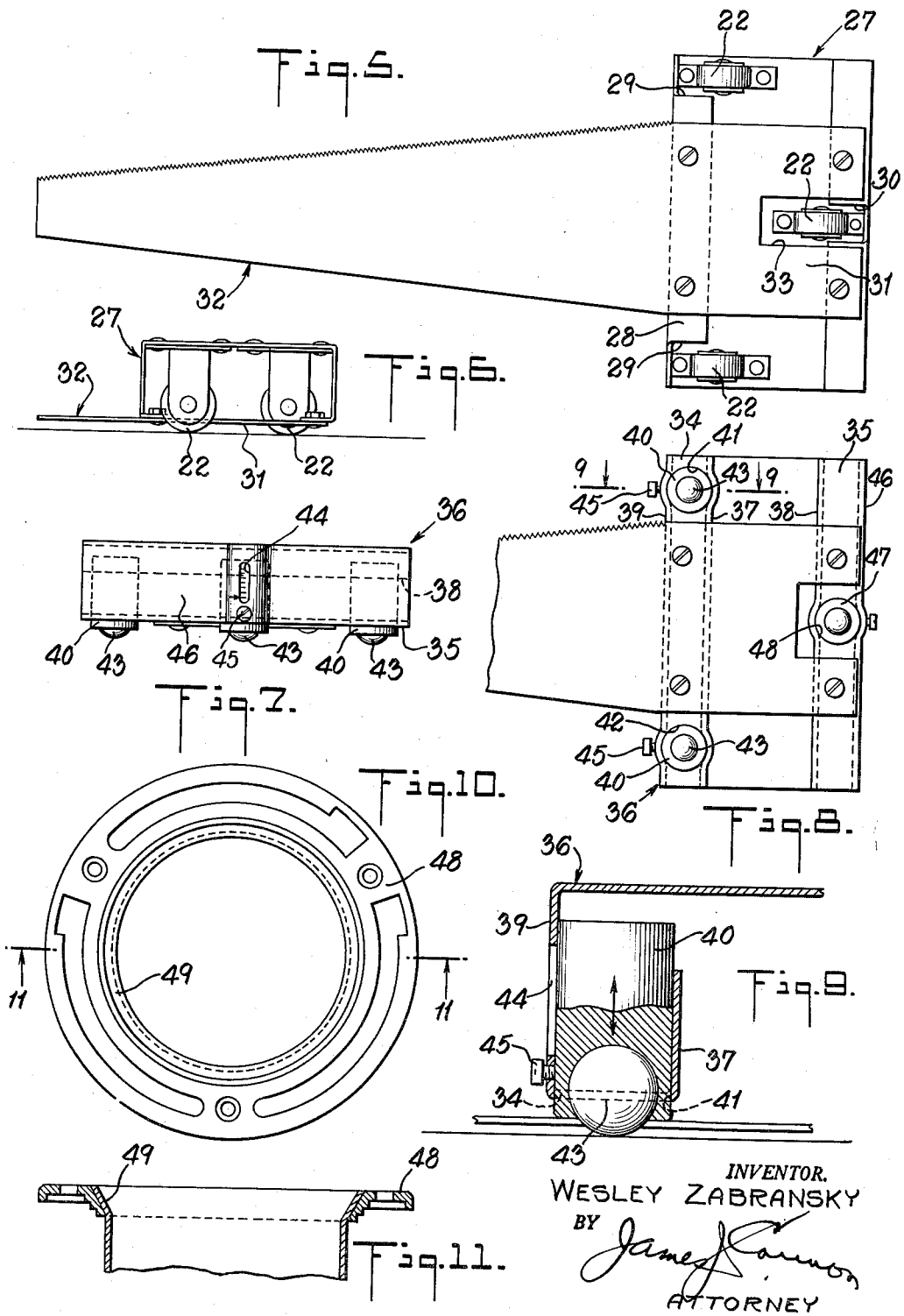

3,038,255
LEAD BEND SAW
Wesley Zabransky, 3 Louis St., Little Ferry, N.J.
Filed Oct. 17, 1960, Ser. No. 63,139
7 Claims. (Cl. 30—92)

My invention relates to plumbing tools and is directed particularly to a saw for efficiently cutting off lead closet bends at the required distance from the floor.

In the installation of water closets coupled to lead closet bend pipes it is necessary to cut off the bend evenly at about ¼ inch from the floor for assembly thereto of the usual closet floor flange. Heretofore ordinary hack saws have been used for this purpose. Because of the closeness of the cut to the floor, however, compass saws are very difficult to manipulate in making an even cut substantially parallel with the floor.

It is accordingly the principal object of my invention to provide a lead bend saw which obviates the difficulties heretofore experienced in cutting closet bends with ordinary tools, and which will make a clean, parallel cut at the required distance from the floor with a minimum of effort.

A more particular object of the invention is to provide a lead bend saw of the above nature which comprises a carriage member mounted on anti-friction bearing members and a saw member extending outwardly of the carriage member at a predetermined distance above the contact zones of the bearing members whereby the carriage member acts not only as a support for reciprocating the saw in sawing action pushed back and forth on its bearings along the floor, but also as a gage to determine the height of the saw above the floor and consequently the height above the floor of the cut to be made on the lead bend.

Other objects, features and advantages of the invention will be apparent from the following description when read with reference to the accompanying drawings. In the drawings, wherein like reference numbers denote corresponding parts throughout the several views:

FIG. 1 is a perspective view of the lead bend saw as used, showing the saw blade cutting a lead pipe parallel to the floor at a prescribed distance therefrom, FIG. 2 is a sectional view taken on line 2—2 of FIG. 1, showing the lead pipe in section with the saw blade cutting part way through, parallel to the floor at a prescribed height, FIG. 3 is a bottom plan view of the cutting device showing the saw blade and carriage and a pair of wheels mounted thereon, FIG. 4 is a side elevational view of FIG. 3, FIG. 5 is a bottom plan of a modified form of carriage having three wheels, FIG. 6 is a fragmentary side view of FIG. 5, FIG. 7 is a rear elevational view of a further modification of the invention having adjustable roller ball bearings, FIG. 8 is a bottom plan view of device shown in FIG. 7, FIG. 9 is a vertical sectional view taken on the line 9—9 of FIG. 8, FIG. 10 is a plan view of closet floor flange after being fastened to cut lead pipe and secured to the flooring, and FIG. 11 is a section taken on line 11—11 of FIG. 10.

Referring now to FIGS. 1, 2, 3 and 4 of the drawings, 10 designates generally a preferred form of lead bend saw embodying the invention, the same comprising a carriage member 11 and a saw member 12 secured against the underside of and extending outwardly of said carriage member. The carriage member 12 comprises a generally box-shape body member 13 which may be of aluminum metal, bent to provide a rectangular top wall portion 14, opposed rectangular side wall portions 15, 16 and opposed inwardly-bent bottom flange portions 17, 18. Secured against the underside of the top wall portion 14 of the body member 13 near each end thereof as by rivets 19 are a pair of wheel support brackets 20. Each wheel support bracket 20 is provided with a pair of spaced, outwardly-extending wheel support arms 21 between each pair of which is journalled a wheel 22.

The saw member 12 comprises a substantially rectangular shank end portion 23 which is securely fastened against the bottom flange portions 17, 18 of the carriage body 13 as by bolts 24. The saw member 12 further comprises a flat, wedged shaped portion 25 which extends outwardly of the side of the carriage member 11 in spaced parallel relation to the top wall portion 14 of said carriage member. One longitudinal edge of the wedge shaped portion 25 of the saw member 12 is provided with cross-cut saw teeth as indicated at 26.

As best illustrated in FIG. 4, the wheels 22 extend outwardly beyond the lower surface of the saw member 12 by a predetermined amount equal to the distance above the floor at which a lead pipe is to be cut.

In use, the lead bend saw will be pressed against the floor flange 48 and moved back and forth with the saw teeth in contact with the lead pipe, starting the saw cut at the predetermined required distance above the floor F (see FIGS. 1, 2 and 9). Since friction of the carriage member 12 against the floor F is very slight because of the support wheels 22, the cut can be completed without difficulty and with accuracy in a very short time.

The modified embodiment of the invention illustrated in FIGS. 5 and 6 differs from the first embodiment of FIGS. 1 through 4 only in that the carriage member 27 is provided with three wheels 22, two located at each end of the forward side of said carriage member, and one located centrally at the rearward side of said carriage member. As illustrated in FIG. 5, the forward bottom flange portion 28 of the carriage member 27 is provided with end cut-outs 29 allowing projection of the forward pair of wheels 22, and the rearward bottom flange portion 28 of said carriage member is provided with a central cut-out 30 allowing projection of the central rear wheel 22. The shank end portion 31 of the saw 32 is also provided with a rectangular cut-out 33 to allow projection of the central rear wheel 22.

FIGS. 7 through 9 illustrate still another embodiment of the invention differing from those described above in that the inner ends of the front and rear flange portions 34, 35 of the carriage member 36 are integrally formed with bent-in inner wall portions 37, 38, respectively. The inner wall portion 37 forms a longitudinal chamber with the front wall 39 of the carriage member 36, and this chamber is arcuately expanded near each end to provide a guide channel for a ball bearing support cylinder 40 vertically movable therein. Circular openings 41, 42 are provided in the front flange portion 34 for projection of the ball bearing support cylinders 40. Each ball bearing cylinder is fitted at its outer end with a ball bearing 43. Means is also provided for adjustably positioning the ball bearing support cylinders 40 with respect to the carriage member 36. To this end, a longitudinal slot 44 is provided in the front wall 39 in register with each of the ball bearing support cylinders 40 through which a set screw 45 threaded into said cylinders extends. Tightening of the set screws 45 will secure the support cylinders 40 in adjusted position. Similarly, the inner wall portion 38 of the carriage member 36 forms a longitudinal chamber with the rear wall 46 of said carriage member which is arcuately expended at a central position to provide a guide channel for an adjustable ball bearing support cylinder 47 extending through a circular opening 48 in the rear flange portion 35. In use, the three support cylinders 40, 40, 47 will be adjusted to elevate the carriage member 36 at the proper distance above the floor for the desired pipe cut, and the cut made as described above.

FIGS. 10 and 11 illustrate a closet floor flange 48 secured to a cut pipe by flaring the upwardly-extending end of said pipe within the ring of said flange and soldering the lead to said flange as indicated at 49.

While the device has been shown and the structure described in detail, it is obvious that this invention is not to be considered limited to the exact form disclosed, but that changes may be made therein, within the scope of what is claimed, without departing from the spirit of the invention.

Having thus disclosed and set forth the invention, what I claim is:

1. A lead bend hand saw comprising, in combination, a horizontally disposable and movable carriage member, a plurality of rolling means projecting outwardly from the underside of said carriage member and operative to support said carriage member horizontally movable on and above a floor or like support surface, and an elongated flat saw attached to and extending outwardly of said carriage member in spaced relation above and with a flat side thereof parallel to said floor or like support surface.

2. The invention as defined in claim 1 wherein said saw is attached at one end to the underside of said carriage member and wherein said plurality of rolling means consists of a pair of rolling means, one located at each side of said carriage member.

3. The invention as defined in claim 2 wherein said rolling means are cylindrical and journalled on an axis substantially perpendicular to the direction of extension of said saw.

4. The invention as defined in claim 1 wherein said saw is attached at one end to the underside of said carriage member and wherein said plurality of rolling means consists of a pair of rollers, one located at each side near the front end of said carriage member and a single rolling means centrally located at the rear end of said carriage member.

5. The invention as defined in claim 4 wherein said rolling means are cylindrical and journalled on axes substantially perpendicular to the direction of extension of said saw.

6. The invention as defined in claim 4 wherein said rolling means are spherical.

7. The invention as defined in claim 6 including means for adjusting the projecting distance of said rolling means with respect to said carriage member.

References Cited in the file of this patent

UNITED STATES PATENTS

| | | |
|---|---|---|
| 407,941 | McAlpine | July 30, 1889 |
| 527,224 | Thyll | Oct. 9, 1894 |
| 969,469 | Gose | Sept. 6, 1910 |
| 1,326,285 | Packer | Dec. 30, 1919 |
| 1,542,127 | Hastings | June 16, 1925 |
| 1,800,081 | Kishell | Apr. 7, 1931 |
| 2,633,880 | Mattson | Apr. 7, 1953 |
| 3,004,570 | Clayton et al. | Oct. 17, 1961 |

FOREIGN PATENTS

| | | |
|---|---|---|
| 60,622 | France | May 12, 1954 |